United States Patent
Goehlich

(10) Patent No.: US 10,232,926 B2
(45) Date of Patent: Mar. 19, 2019

(54) INTEGRATED LAMINATION PROCESS FOR MANUFACTURING A SHELL ELEMENT

(71) Applicant: AIRBUS OPERATIONS GMBH, Hamburg (DE)

(72) Inventor: Robert Alexander Goehlich, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 29 days.

(21) Appl. No.: 14/637,904

(22) Filed: Mar. 4, 2015

(65) Prior Publication Data
US 2015/0251400 A1   Sep. 10, 2015

(30) Foreign Application Priority Data

Mar. 6, 2014 (EP) ..................... 14158187

(51) Int. Cl.
*B64C 1/06* (2006.01)
*B29C 70/34* (2006.01)
(Continued)

(52) U.S. Cl.
CPC ............ *B64C 1/064* (2013.01); *B29C 70/342* (2013.01); *B29D 99/0014* (2013.01);
(Continued)

(58) Field of Classification Search
CPC ........... B64C 1/06; B64C 1/061; B64C 1/064; B64C 1/065; B64C 1/068; B64C 1/069; B64C 1/08; B64C 1/10; B64C 1/12
See application file for complete search history.

(56) References Cited

U.S. PATENT DOCUMENTS

| | | | | |
|---|---|---|---|---|
| 2,212,456 A | * | 8/1940 | Rethel ..................... | B64C 1/068 244/119 |
| 4,472,473 A | * | 9/1984 | Davis ..................... | E04C 2/322 428/182 |

(Continued)

FOREIGN PATENT DOCUMENTS

GB          2 110 736          6/1983

OTHER PUBLICATIONS

Partial EP Search Report for EP Application 14158187.6, dated Sep. 8, 2014, 5 pages.

(Continued)

*Primary Examiner* — Jessica B Wong
(74) *Attorney, Agent, or Firm* — Nixon & Vanderhye P.C.

(57) ABSTRACT

A process for manufacturing an integrated shell element including: providing a shell element lay-up tool with an upper tool surface; laying-up a resin impregnated fibers on the upper tool surface to form the shell element; providing on the resin impregnated fibers a stiffener element layup tool having surfaces to support a stiffener element structure; laying-up resin impregnated fibers on the stiffener element lay-up tool to form the stiffener element; curing in a single step the resin impregnated fibers such that the fibers forming the shell element and the fibers forming the stiffener element are laminated into an integrated shell element having a longitudinal or transversal stiffener element; and separating the integrated shell element from the shell element and stiffener element lay-up tools.

7 Claims, 6 Drawing Sheets

(51) Int. Cl.
*B29D 99/00* (2010.01)
*B64C 1/12* (2006.01)
B29L 31/30 (2006.01)
B64C 1/00 (2006.01)

(52) U.S. Cl.
CPC ............... *B64C 1/068* (2013.01); *B64C 1/12* (2013.01); *B29L 2031/3082* (2013.01); *B64C 2001/0072* (2013.01); *Y02T 50/43* (2013.01); *Y10T 156/1002* (2015.01)

(56) References Cited

U.S. PATENT DOCUMENTS

| | | | |
|---|---|---|---|
| 8,651,419 B2 * | 2/2014 | Glynn | B64C 1/061 244/117 R |
| 2006/0108058 A1 * | 5/2006 | Chapman | B29C 70/323 156/245 |
| 2009/0277994 A1 | 11/2009 | Lobato et al. | |
| 2010/0124659 A1 * | 5/2010 | Nelson | B29C 35/0266 428/411.1 |
| 2013/0115429 A1 | 5/2013 | Valle | |
| 2013/0180642 A1 | 7/2013 | Blot et al. | |

OTHER PUBLICATIONS

Extended EP Search Report for EP Application 14158187.6, dated Nov. 25, 2014, 10 pages.

* cited by examiner

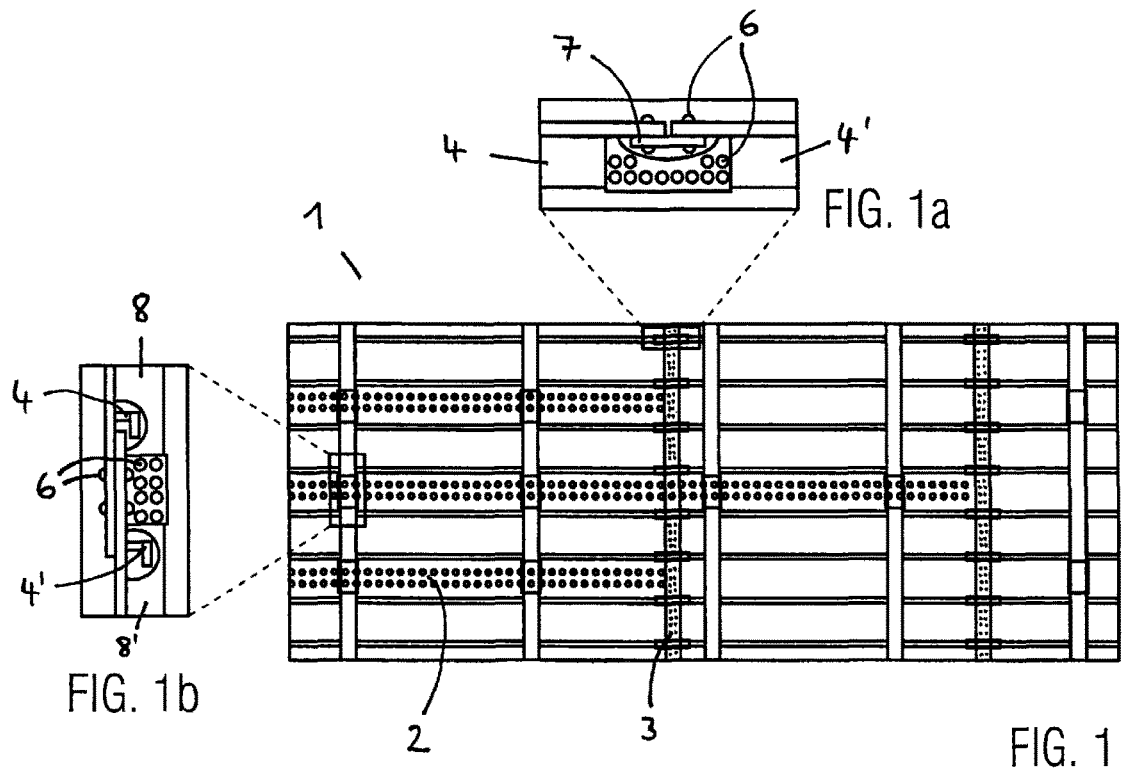
FIG. 1a
FIG. 1b
FIG. 1
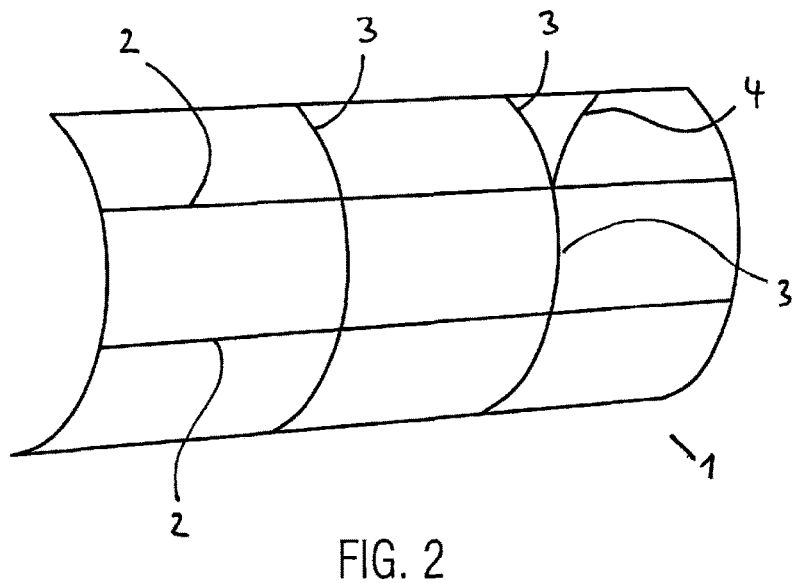
FIG. 2

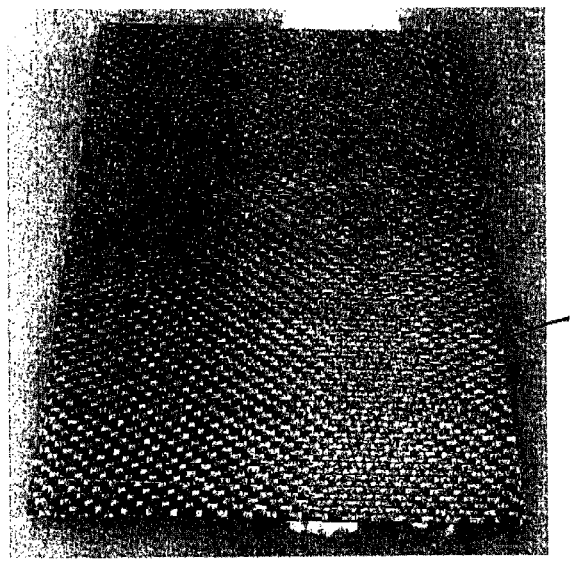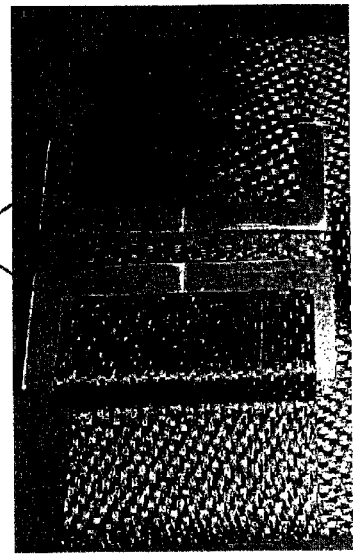
FIG. 4a　　　　　　　　　　　FIG. 4b
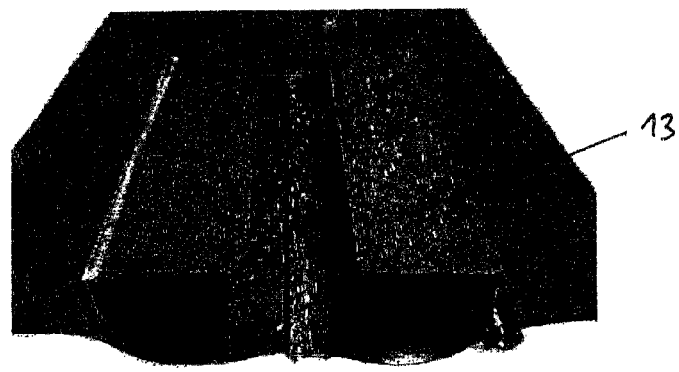
FIG. 4c

INTEGRATED LAMINATION PROCESS FOR MANUFACTURING A SHELL ELEMENT

RELATED APPLICATION

This application claims priority to European Patent Application No. 14 158 187, filed Mar. 6, 2014, the entirety of which is incorporated by reference.

BACKGROUND OF THE INVENTION

The invention relates to a process for manufacturing an integrated shell element comprising at least one longitudinal or transversal stiffener element, in particular an integrated shell element of an aircraft fuselage or a spacecraft fuselage and a shell element field and the further structures which can be manufactured made from such elements, in particular an aircraft or spacecraft fuselage.

Large scale structures, such as the fuselage of an aircraft or the wing of an aircraft, the body of a carrier rocket, a booster, a spaceship, the module of a space station, a satellite, or similar structures may comprise composite shell elements forming the outer shell (skin) of the large scale structure. Such composite shell elements may be formed from fiber-reinforced composite materials, such as carbon fiber reinforced plastic materials.

Furthermore, the fuselage of an aircraft or spacecraft typically comprises stiffeners running in the longitudinal direction of the fuselage (typically called stingers) and stiffeners running transversely to the stringers in the circumferential direction of the fuselage (typically called ribs or frames). These elements impart to the fuselage the required structural strength and support the outer skin of the fuselage.

The longitudinal stiffeners (stringers) accommodate the longitudinal loads, the transversal or circumferential stiffeners (frames) accommodate the transversal circumferential loads and moments, while the skin primarily accommodates the internal pressure and also longitudinal and shear loads.

System installations and cabin components which have to be installed during the final assembly of the aircraft or spacecraft in large numbers in the fuselage are normally fastened, according to the present state of the art, by means of individual brackets mounted to the frames running in the circumferential direction of the fuselage or to the stringers running in the longitudinal direction of the fuselage.

In an aircraft or spacecraft fuselage based on metal skin elements, the stringers and frames are usually assembled to the skin by rivets or welded seams. In structures based on composite materials, rivets or adhesives are used as means of assembling the frames and stringers to the skin elements.

In a process for manufacturing an aircraft or spacecraft fuselage, stringers and clips/angles are usually first riveted or welded to shell elements (also termed skin field elements herein). Then, the frames are positioned on those shell elements and riveted using the clips. The so supported shell elements are then assembled along the longitudinal direction by riveting the shell elements together in areas of longitudinal overlap. The assembled shell elements that form a skin field are then joined along the vertical direction into straight cylinders that are also referred to as barrels. In a further step, the straight cylinders are joined into an aircraft or spacecraft fuselage by means of a similar process as described above, i.e., by welding or riveting. The types of longitudinal joints (welding, riveting, adhesive bonding) as well as the couplings used have an influence on the overall weight of the aircraft or spacecraft fuselage and the costs and design of the process steps used to achieve the assemblies as described above. After the assembly of the fuselage components, brackets are installed to prepare for systems installations.

SUMMARY OF INVENTION

A process has been conceived and is disclosed herein for the efficient manufacture of an aircraft or spacecraft fuselage including the manufacture of fuselage elements (termed shell or skin elements) supported by a backing structure comprising stringers or frames. Similarly, a shell element has been conceived and is disclosed comprising stringers or frames that can be made by an efficient process of manufacture, which element provides for additional advantages in the context of systems installation.

The conceived process for manufacturing an integrated shell element having inner and outer surfaces and comprising on the inner surface at least one longitudinal or transversal stiffener element, may comprise:

providing a shell element lay-up tool comprising an upper tool surface;

laying-up a plurality of resin impregnated fibers on said upper tool surface to form the shell element;

providing on the plurality of resin impregnated fibers laid-up in step (ii) a stiffener element lay-up tool comprising a sufficient number of surfaces to support a stiffener element structure;

laying-up a plurality of resin impregnated fibers on said stiffener element lay-up tool and on a selected area of the fibers laid-up in step (ii) to form the stiffener element;

curing in a single step said plurality of resin impregnated fibers laid-up in steps (ii) and (iv) such that the plurality of fibers forming the shell element and the plurality of fibers forming the at least one stiffener element are laminated into an integrated shell element comprising the at least one longitudinal or transversal stiffener element;

separating the integrated shell element formed in step (v) from the shell element and stiffener element lay-up tools.

The above process is also referred to as the first aspect of an embodiment of the invention(s) disclosed herein.

A second aspect relates to a process for manufacturing a shell, said process comprising connecting a plurality of shell elements manufactured according to the process of the first aspect to form a skin field; further connecting the skin field to partial or full barrels for forming a shell structure and connecting the partial or full barrels to form the shell.

A third aspect relates to an integrated shell element comprising at least two longitudinal or transversal stiffener elements or a shell element field comprising at least two integrated shell elements each of which comprising at least one longitudinal or transversal stiffener element, wherein said shell element is made of a plurality of resin impregnated fibers, wherein the stiffener elements have a cross profile including an open segment, such as the open segment of a C-profile or a Z-profile, and wherein at least two stiffener elements which are positioned adjacent to each other on either the same shell element or adjacent shell elements are oriented such that the open segments of their cross-profiles are opposite to each other.

A fourth aspect relates to a shell, in particular an aircraft or spacecraft fuselage, comprising an integrated shell element or a shell element field according to the third aspect.

A fifth aspect relates to a means of transport selected from the group consisting of an aircraft, such as an airplane or a helicopter, and a spacecraft, such as a carrier rocket, a booster, a spaceship, a satellite, and a space station, said means of transport comprising a shell according to the fourth aspect.

Further aspects of an embodiment(s) of the invention(s) disclosed herein are disclosed in the dependent claims and the following detailed description of the present invention. In this context, when reference is made herein to an aircraft, it is to be understood that the respective disclosure equally applies to a spacecraft.

The process disclosed herein may provide one or more of the following advantages. By laminating pluralities of resin-impregnated fibers that form the skin elements and of resin-impregnated fibers that form the stiffener elements, said pluralities of resin-impregnated fibers usually being provided in the form of prepregs semi-finished products (briefly referred to as 'prepregs' (pre-impregnated sheet materials) in a single step, i.e., as "co-curing" under suitable temperature and pressure conditions (autoclaving), a simplification and related improvements of the manufacturing process are obtained. For example, the use of rivets is avoided which in turn is associated with a noise reduction in the manufacturing environment and a corresponding weight reduction in the shell/fuselage structure produced.

Furthermore, as compared to adhesive bonding, preparation steps such as pre-bonding surface treatment, are avoided and limitations associated with the (limited) durability of adhesive bonding are overcome.

The embodiment of the present invention in which adjacent stiffeners having a cross-profile characterized by an open segment are oriented such that the open segments of the cross-profiles are opposite to each other allows for the assembly of brackets for the further assembly of systems and routes in a quick and simple way. In particular, the embodiment in which the upper edges of stiffener elements as described herein are corrugated allows for quick and simple assembly of brackets and is further associated with the advantage that the assembled brackets are secured in their original positions as the corrugated edge structure avoids slip along the edges.

In the following detailed description, the present invention is largely described in the context of aircraft (fuselage) construction. However, it will be understood that the teaching of the present invention equally applies to spacecraft construction, such as the construction of carrier rockets, modules of a spaceship, a space station or a satellite. Also, teachings discussed with respect to stringers as longitudinal stiffening elements may equally be applied to frames as transversal stiffening elements.

Furthermore, the methods, elements and structures provided by the present invention may be combined with conventional technologies known in the art. For example, a skin element comprising at least one longitudinal stiffener (stringer) made in accordance with the present invention may be further processed and provided with further stiffener elements such as a frame assembled by known means such as adhesive bonding or riveting.

SUMMARY OF THE DRAWINGS

The present invention is described hereinafter with reference to the drawings, in which exemplary embodiments of skin elements and skin fields of an aircraft fuselage structure according to the invention are shown, wherein:

FIG. 1 is a top view of the inner side of a part of an aircraft fuselage comprised of a number of skin elements comprising stringer, frames and couplings, said elements being connected by rivets;

FIG. 1a is an enlarged side view of a stringer coupling and a longitudinal joint of two skin elements;

FIG. 1b is an enlarged side view of a frame coupling and a transversal (circumferential) joint of two skin elements;

FIG. 2 is a perspective view of the outer side of a skin filed along the longitudinal direction of the skin field comprised of a plurality of skin elements;

FIG. 4a is a photograph of a prepreg material layer used to illustrate a skin element;

FIG. 4b is a photograph of a prepreg material layer and of metal blocks to illustrate the use of a stiffener lay-up tool for supporting further prepreg layers and of further prepreg material layers laid up on the metal blocks to illustrate the positioning of prepregs on the stiffener lay-up tool;

FIG. 4c is a photograph of the pregreg materials laid up as shown in FIGS. 4a and 4b after curing to illustrate the principle of an integrated skin element comprising two stiffener elements after lamination and separation from the stiffener lay-up tool;

DETAILED DESCRIPTION OF THE INVENTION

Figure 3A:
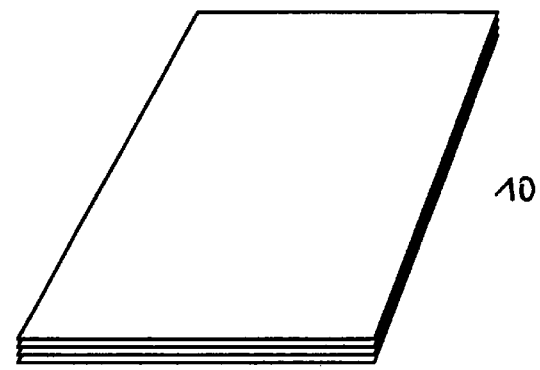
FIG. 3a is a perspective view of a multitude of prepreg layers to be laminated to form a skin element.

First, it is noted that when reference is made hereinafter to directions, this is based on the usual coordinate system used in aircraft construction.

In this coordinate system, the so called X-direction extends in the longitudinal direction of the fuselage from front to back. It is also called longitudinal direction or axis.

The Y-direction is the direction of extension of the support surfaces within the interior of the aircraft such as the cabin floor. It is also called horizontal direction or axis.

Finally, the Z-direction is perpendicular to the X-direction and Y-direction and is also called the vertical axis. The plane defined by the Y- and Z-direction is transversal to the longitudinal direction and contains the circumferential direction of the fuselage, also called transversal or circumferential direction.

First, referring to FIG. 1, a conventional skin field (1) based on a plurality of skin elements connected to each other along longitudinal and circumferential edge sections (2,3) including a backing structure is shown. Specifically, skin elements are connected by rivets and the skin element field so obtained is supported by a backing structure as described in the introductory section hereinabove, said backing structure comprising stringers and frames.

The enlarged view presented in FIG. 1a shows the connection of two sections of longitudinal stiffeners (stringers) (4,4') by means of a riveted coupling, e.g., in the forms of a U-shaped part (5) encompassing the adjacent end sections of the stiffeners and located at a transversal connection line of two skin elements which are also connected by rivets (6), the connection being supported by a further element (plate) (7) which overlaps with the transversal edge regions of the skin elements attached to each other.

The enlarged view presented in FIG. 1b shows the connection of two sections of frames (8,8') by means of a riveted coupling, e.g., in the form of a U-shaped part located at a longitudinal connection line of two skin elements which are also connected by rivets (6). In this instance, the connection is supported by an area of overlap of the longitudinal edge regions of the skin elements attached to each other. The frames also comprise cutouts (9) for stringers (4,4').

FIG. 2 is a perspective view of the outer side of a skin field (1). The elements of the skin field have longitudinal and transversal (circumferential) connecting lines (2,3). The skin fields have a curved shape (in the circumferential direction) so as to form the desired cylinder-like or elliptical shape of the shell. The shell components may have any suitable shape such as the shape of squares, rectangles, trapezoids such as rhombi, parallelograms or triangles and are curved in at least one axis, as discussed above, or in two axes. The shell component may also have rounded shapes (4) such as the skin elements in the upper right of FIG. 2.

Shell components connected to form a shell field are arranged in such a way that they form a closed shell in the circumferential direction thereby forming full cylinders also called barrels.

Referring to FIG. 3a, a skin element or a skin field comprising a plurality of skin elements is made by laying of sheets or tapes of resin pre-impregnated fiber enforced materials ("prepregs") (10), also referred to as prepreg semi finished products, on the upper surface of a suitable tool (not shown in FIG. 3a). The tool is a support structure for depositing (laying of) pregregs and is formed such that it is the counterpart form of the shell segment to be made from the respective skin element or skin field.

In particular, the tool surface is curved in at least one direction, in accordance with the cylinder, cylinder-like or elliptical shape of the fuselage of an aircraft or spacecraft for which the skin element is to be used, i.e., in the plane defined by the Y- and Z-directions as discussed hereinabove. In particular, the tool surface does not comprise any corrugations such as grooves or elevations within the curved plane that is defined by the shape of the fuselage segment, i.e., the shell or skin element used for making said fuselage segment. In other words, the curvature of the tool surface is characterized by it being the counterpart form of the outer surface of the shell segment to be made from the respective skin element or skin field and does not comprise small scale corrugations or elevations that would introduce further smaller scale curvatures other than those determined by the shape of the outer surface of the fuselage segment to be made from the respective skin element or skin field.

More specifically, the tool surface does not, in addition to the curvature(s) determined by the desired shape of the outer surface of the fuselage segment to be made from the respective skin element or skin field, comprise additional curvatures having changing directions in the transversal or longitudinal directions.

As is known in the art, by using automatic laying devices comprising one or more moveable application heads, prepreg semifinished products can be applied to the tool surface in short throughput times.

The fibers of the prepregs may be unidirectional rovings (bundles of fibers) such as carbon or glass fibers or aramid fibers. The rovings may have a tex number of 3 k (corresponding to 3,000 filaments). Carbon fiber reinforced materials may be used.

Alternatively, instead of the fiber reinforced materials disclosed herein, other polymeric (non-fiber reinforced) materials may be used which display corresponding physical, chemical or mechanical properties, i.e., which are capable of accommodating the loads and forces that occur during use of shell elements made from those materials in the operation of an aircraft or spacecraft.

After laying of the prepreg sheets or tapes that are intended to form the skin element, in accordance with step (iii) of the process of the present invention, a stiffener element lay-up tool (11) comprising a sufficient number of surfaces to support a stiffener element structure is provided.

For example, according to one embodiment, if the stiffener element is intended to have a Z-like cross-profile, the stiffener element lay-up tool has at least two surfaces that support the parts of the stiffener element that extend into the interior of the shell to be made by using the integrated shell element of the present invention and additional surfaces for positioning the stiffener element lay-up tool on the pluralities of fibers (prepreg sheets or tapes) laid-up on the shell element lay-up tool as described herein.

Figure 3B:
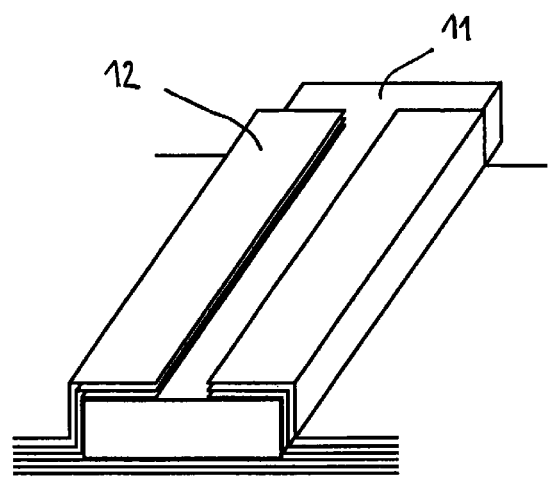
FIG. 3b is a perspective view of a multitude of prepreg layers and a stiffener lay-up tool for forming an integrated skin element comprising two stiffener elements.

The stiffener element lay-up tool usually consists of a number of individual parts (not shown in FIG. 3b) positioned to provide the required surfaces to support the prepreg layers that after curing form the desired stiffener elements. The stiffener element lay-up tool is usually made of a material capable of resisting the conditions applied in curing step (v) of the present invention.

After providing the stiffener element lay-up tool, a plurality of resin impregnated fibers (12) is deposited on said stiffener element lay-up tool to form the desired stiffener element structure. As described above, automatic laying devices comprising one or more moveable application heads can be used to apply a plurality of resin impregnated fibers in the form of prepreg semi-finished products to the tool surface(s) in short throughput times.

As desired, the additional prepreg layers for forming the stiffener element structure are laid-up on a selected area of the fibers (prepregs) laid-up on the tool supporting the shell element to provide a firm and durable connection of the stiffener element to the skin.

For example, with regard to stringers running in the longitudinal direction of a skin element, the common area (contact area) of a prepreg forming the skin and a prepreg layer forming the stiffener element is selected such that a foot section of the stiffener element results that affords the desired mechanical stability. The specific dimensions vary based on the overall dimensions of the fuselage for the manufacture of which the skin element will be used. Specific embodiments of suitable foot sections of stiffener elements are described below.

Figure 3C:
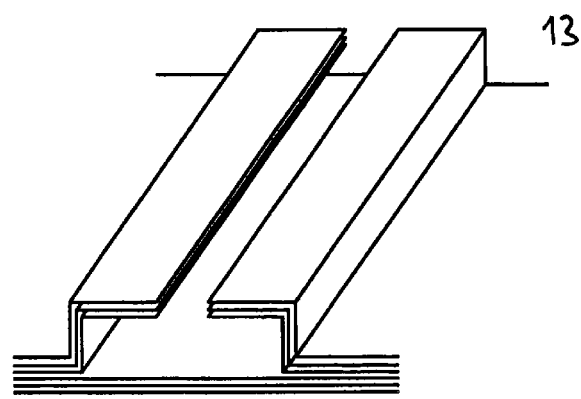
FIG. 3c is a perspective view of a multitude of prepreg layers laminated into an integrated skin element comprising two stiffener elements after separation from the stiffener lay-up tool.

FIG. 3c is a perspective view of a multitude of prepreg layers laminated into an integrated skin element (13) comprising two stiffener elements after curing and separation from the stiffener lay-up tool.

The curing of the prepreg semi-finished products can be carried out in an autoclave, such as under pressure using predetermined temperature and pressure gradients. The specific parameters of the process are usually set and optimized based on the parameters of the respective prepreg resin used. Also, peel plies, perforated release films, pli absorbers, and breather fabrics are used, as is known in the art.

In order to illustrate the 'origin' of the integral skin element having two stiffener elements, FIG. 3c still shows the layers of the prepreg sheets used to form the integrated structure. However, it will be appreciated that the final structure formed after the curing (autoclaving) step will be an integrated laminated structure.

FIGS. 4a, 4b and 4c are photographs that illustrate the process steps as described above in the context of FIG. 3a to 3c. A number of metal blocks (14) was used to illustrate the use of a stiffener element lay-up tool. It will also be appreciated that the actual prepreg material sheets (15) used in the test run and the final structure shown in FIG. 4a to 4c are for illustrating the principle underlying the present invention only and are not capable for use in an actual aircraft. For example, the final structure shown in FIG. 4c still shows ridges which in practice would either be removed during further processing or the formation of which would be avoided by suitable design of the lay-up tool.

Figure 5:
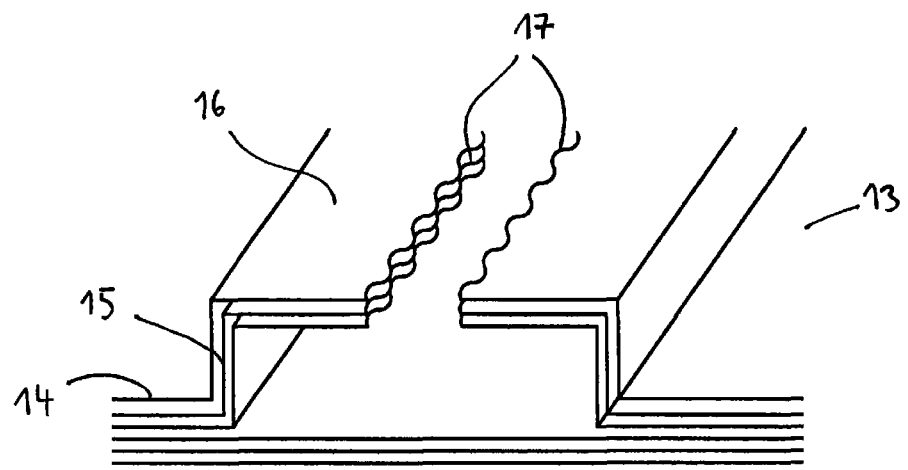
FIG. 5 is a perspective view of a multitude of prepreg layers laminated into an integrated skin element comprising two stiffener elements after separation from the stiffener lay-up tool, wherein the upper edges of the open segments of the stiffener profile are corrugated.

FIG. 5 is a perspective view of a multitude of prepreg layers laminated into an integrated skin element (13) comprising two adjacent stiffener elements after separation from the stiffener lay-up tool, wherein the upper edges of the open segments of the stiffener profile are directed opposite to each other and are corrugated.

More specifically, the stiffener elements have a Z-like cross profile wherein the foot (14) (also referred to as lower flange) of the stiffener is formed by prepreg layers deposited on those prepreg layers that form the skin element. The profile further extends into a section essentially oriented perpendicular to the lower flange, also called web (15), which connects the lower flange with an upper flange (16) the edge (17) of which is corrugated. The orientation of the web and upper flange of the stiffener elements is determined by the dimensions and surfaces of the stiffener element lay-up tool as described above. The longitudinal and lateral dimensions of the corrugations along the edge of the upper flange are within the range of mm to cm and are adapted to the size of brackets that are assembled to the stiffener elements.

Also, the transversal distance between two adjacent stiffener elements of an embodiment as shown in FIG. 5 may be selected such that it allows for the assembly of brackets and desired systems installations.

Alternatively, the stiffener elements may have an omega-, C-, L-, or blade-like cross profile (not shown). The lay-up tool and laying process are then adapted accordingly.

Figure 6:
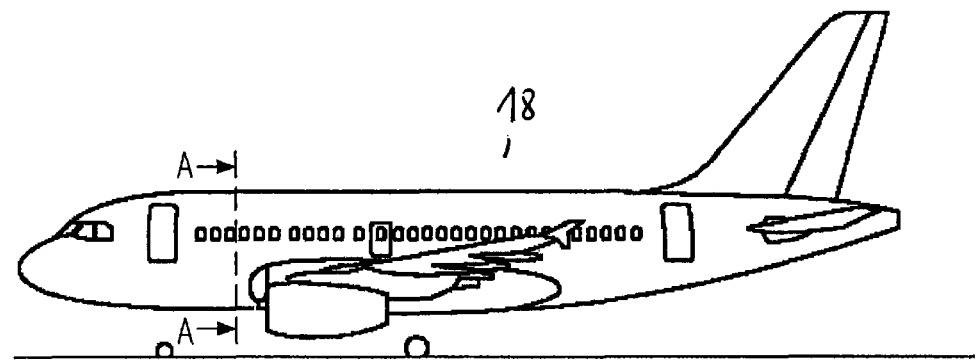
FIG. 6 is a side view of an airplane indicating a sectional plane A-A'.

FIG. 6 is a side view of an airplane (18) indicating a sectional plane A-A'.

Figure 7:
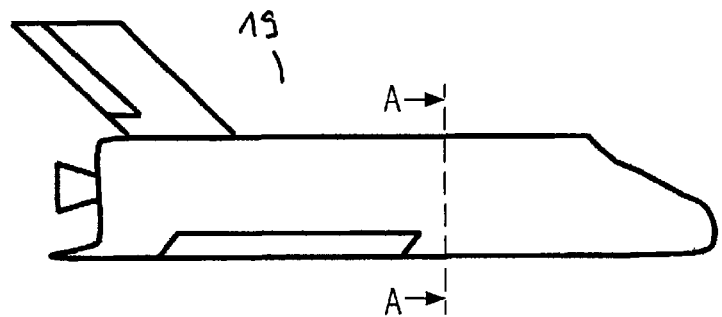
FIG. 7 is a side view of a spaceship indicating a sectional plane A-A'.

FIG. 7 is a side view of a spaceship (19) indicating a sectional plane A-A'.

Figure 8:
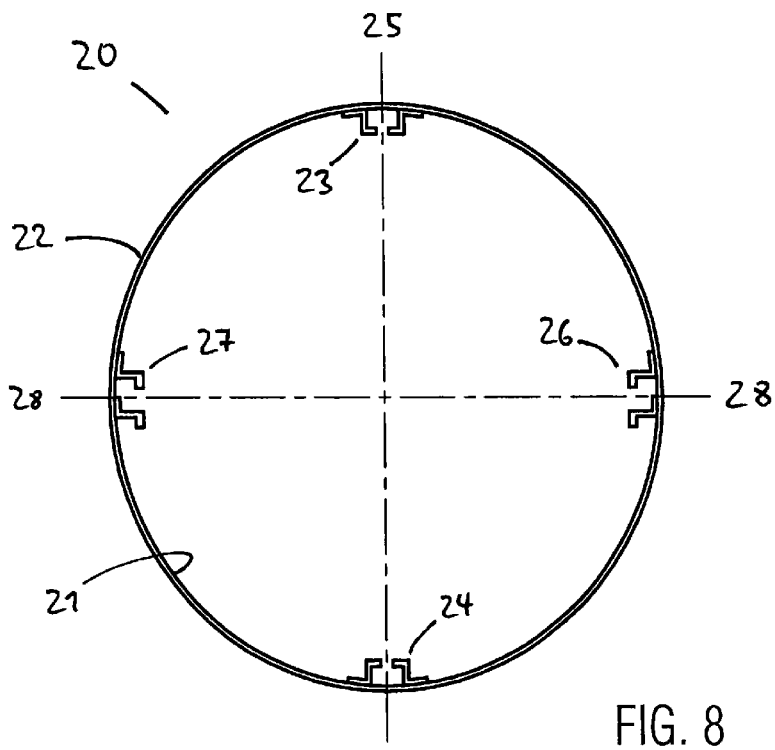
FIG. 8 is a cross-sectional view of a barrel of an aircraft fuselage at the sectional plane A-A' shown in FIG. 6 showing top, side, and bottom sections provided with stringers wherein the open segments of the cross-sections of adjacent stringers have alternating orientations.

FIG. 8 is a cross-sectional view of a barrel (20) of an aircraft fuselage at the sectional plane A-A' shown in FIG. 6. The barrel has inner (21) and outer (22) skin surfaces and top, side, and bottom sections provided with stringers made in accordance with the process of the present invention. The stringers have Z-like cross profiles and are oriented with open segments either being opposite to each other (top (22), bottom (24) at the vertical axis (25)) or with at least one of the open segments facing away from the adjacent stiffener (side sections (26, 27) at the horizontal axis (28)). The alternating orientations of the stringer cross-profiles of this embodiment are advantageous in the context of ensuring that water formed by condensation in the area of the stiffeners is not collected within the stiffeners but may be collected in a bottom area of an aircraft fuselage, and may then be dispensed by suitable means.

Thus, according to an embodiment, stringers (26, 27) positioned at the side sections of a barrel of the aircraft fuselage are characterized by cross-profiles having open segments, such as Z-cross profiles, the open segments pointing downwards along the vertical axis Z or toward the bottom center of the barrel, while stringers (23, 24) positioned at the top and bottom sections of the aircraft fuselage are characterized by cross-profiles having open segments, such as Z-cross profiles, the open segments being opposite to each other.

It will be understood that, in addition to the stringers shown in FIG. 8, a plurality of additional stringers (not shown in FIG. 8) may be present depending on the overall design of the aircraft fuselage to be supported by stiffener elements made in accordance with the present invention. This also applies to the further embodiments shown in FIGS. 9 to 11, as described hereinbelow. For example, with respect to the cross-section segment of a barrel segment defined by the neighboring intersection points (100) and (101) of the vertical axis (25) and the vertical axis (28), 1, 2, 3, 4, 5, 6, 7, 8, 9, 10, 11, 12 or more stringers may be present.

Also, a desired proportion of the stringers may have a design characterized by a corrugated edge structure (not shown) as discussed in the context of FIG. 5 above. This also applies to the further embodiments shown in FIG. 9 to 11.

Figure 9:
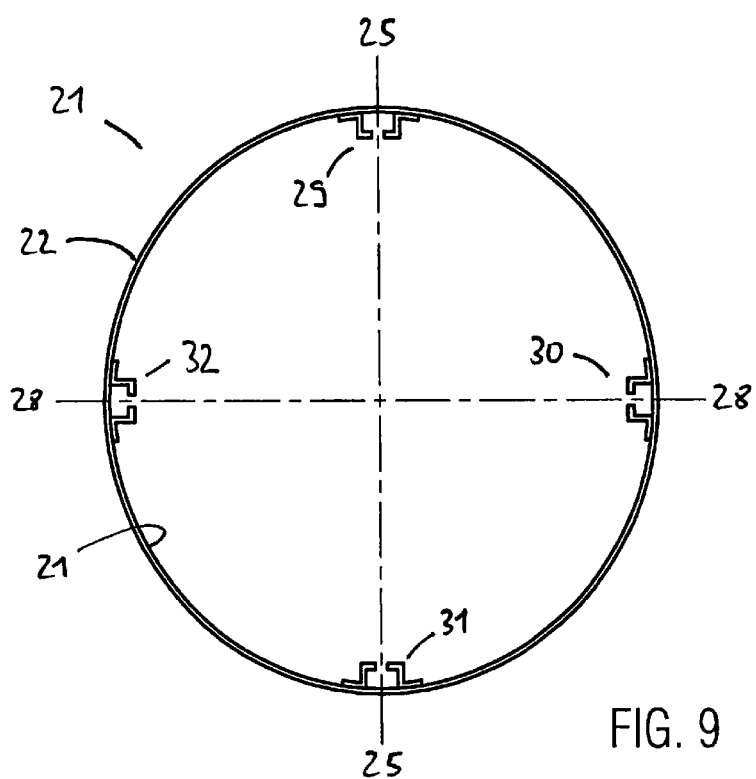
FIG. 9 is a cross-sectional view of a barrel of a spacecraft fuselage at the sectional plane A-A' shown in FIG. 7 showing top, side, and bottom sections provided with stringers wherein the open segments of the cross-sections of adjacent stringers have the same orientations.

FIG. 9 is a cross-sectional view of a barrel (21) of a spacecraft fuselage at the sectional plane A-A' shown in FIG. 7, said barrel having top, side, and bottom sections provided with stringers made in accordance with the process of the present invention, wherein the stringers (29 to 31) have Z-like cross profiles and are oriented with open segments being opposite to each other. If necessary, the stringers provided in the side sections may include means (not shown in FIG. 9) for draining condensation water that may form in use of an aircraft/spacecraft within the space defined by the open segment of the stringer cross-profile.

Figure 10:
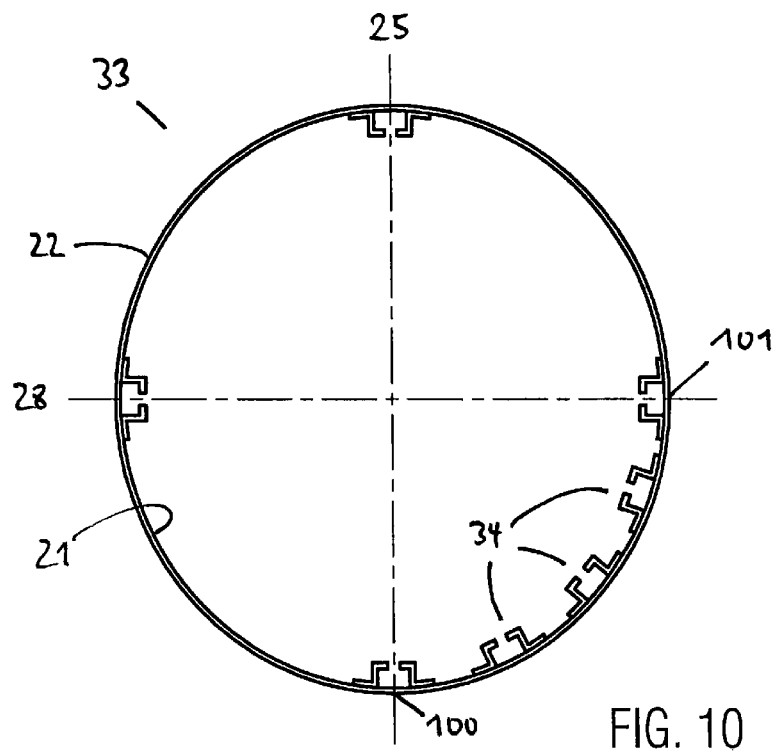
FIG. 10 is a further cross-sectional view of a barrel of an aircraft or spacecraft fuselage at the sectional plane A-A' shown in FIGS. 6 and 7.

FIG. 10 is a further cross-sectional view of another embodiment (33) of a barrel of an aircraft or spacecraft fuselage at the sectional plane A-A' shown in FIG. 6 or 7, showing further stringers (34) positioned in the sections between the horizontal and vertical axes, wherein the further stringers also have Z-like cross profiles and are oriented with open segments being opposite to each other.

Figure 11:
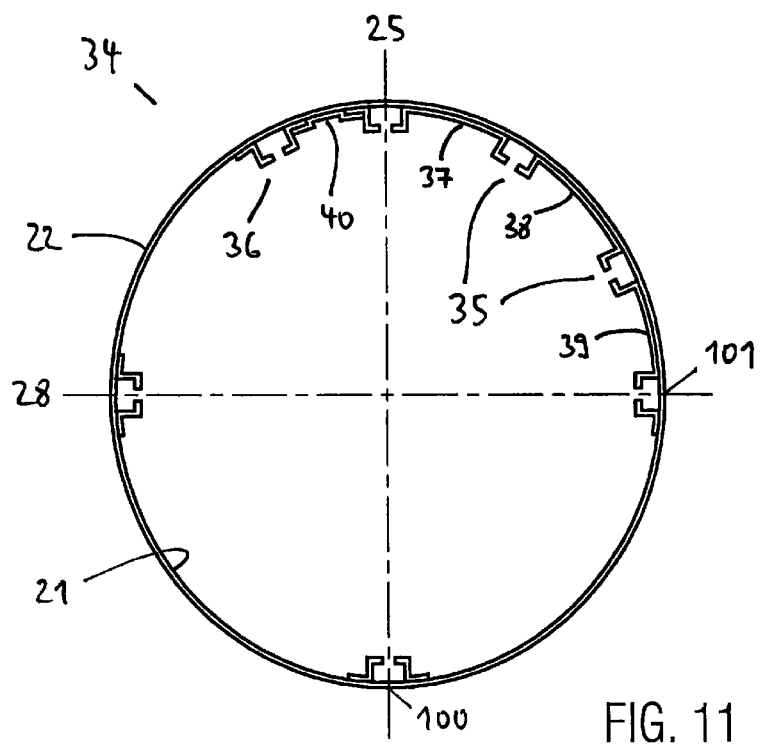
FIG. 11 is a further cross-sectional view of a barrel of an aircraft or spacecraft fuselage at the sectional plane A-A' shown in FIGS. 6 and 7.

FIG. 11 is a cross-sectional view of another embodiment (34) of a barrel of an aircraft or spacecraft fuselage at the sectional plane A-A' showing further stringers (35, 36) positioned in the sections between the horizontal and vertical axes, wherein the further stringer also have Z-like cross profiles and are oriented with open segments being opposite to each other.

Furthermore, the foot sections of the stringers shown in the upper right section of the barrel are formed from common prepreg layers (37, 38, 39) which layers will also reinforce the skin section in between the stringers. Alternatively, this effect may be achieved by laying up an additional skin prepreg layer (40) on the prepreg layers of neighboring stiffener elements. It will be understood that the sections of a barrel where these techniques are used may vary depending on the overall design of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

I claim:

1. An aircraft fuselage, comprising:
   a skin;
   at least two pairs of longitudinal or transversal stiffener elements;
   each of the stiffener elements having a L-shaped profile with a cantilevered first flange parallel to the skin supported by a second flange perpendicular to the skin and extending between the first flange and the skin;
   wherein the longitudinal free edge of the first flange of each stiffener element is corrugated and in a facing relation to the longitudinal free edge of the first flange of the other stiffener element of the same pair;
   wherein each pair of the at least two pairs of stiffener elements define an opening therebetween;
   wherein the skin is made of a plurality of laminated, cured prepreg layers;
   wherein at least one of the plurality of cured prepreg layers forms only the skin; and
   wherein at least one other of the plurality of cured prepreg layers forms both the skin and at least one of the stiffener elements.

2. The aircraft fuselage of claim 1, wherein the at least two pairs of longitudinal or transversal stiffener elements are located at a top section of the aircraft fuselage, relative to a vertical axis of the aircraft fuselage.

3. The aircraft fuselage of claim 2, further comprising a second group of the at least two pairs of longitudinal or transversal stiffener elements positioned at a bottom section of the aircraft fuselage, relative to the vertical axis of the aircraft fuselage.

4. The aircraft fuselage of claim 3, further comprising a third group of the at least two pairs of longitudinal or transversal stiffener elements positioned at a first side section of the aircraft fuselage, relative to a horizontal axis of the fuselage.

5. The aircraft fuselage of claim 4, further comprising a fourth group of the at least two pairs of longitudinal or transversal stiffener elements positioned at a second side section of the fuselage of the aircraft opposite the first side section of the aircraft fuselage.

6. The aircraft fuselage of claim 5, wherein the free edges of the at least two pairs longitudinal or transversal stiffener elements in the third and fourth groups point downwards along the vertical axis or toward the bottom center of the aircraft fuselage.

7. The aircraft fuselage of claim 1, wherein a foot section of each of the at least two pairs of longitudinal or transversal stiffener elements is formed from a common prepreg layer which also reinforces the skin of the aircraft in between the pair of stiffener elements.

* * * * *